No. 767,120. PATENTED AUG. 9, 1904.
P. W. PRATT.
RUBBER TREAD.
APPLICATION FILED OCT. 3, 1903.
NO MODEL.
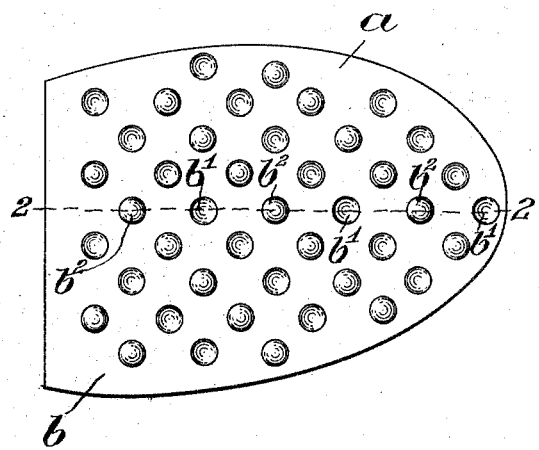
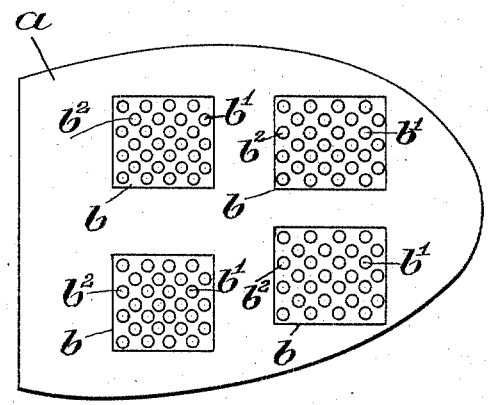
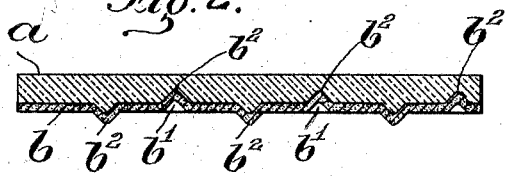
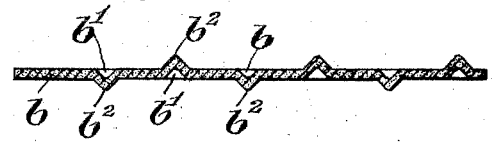
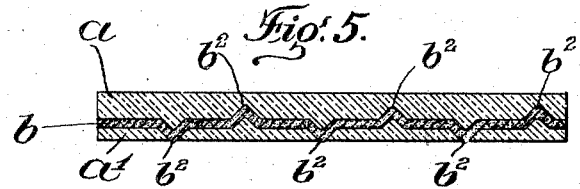
Witnesses:
Fred. E. Dorr.
H. Brown
Inventor:
P. W. Pratt
by Wright Brown & Quinby
attys No. 767,120. Patented August 9, 1904.

UNITED STATES PATENT OFFICE.

PHILIP W. PRATT, OF BOSTON, MASSACHUSETTS.

RUBBER TREAD.

SPECIFICATION forming part of Letters Patent No. 767,120, dated August 9, 1904.

Application filed October 3, 1903. Serial No. 175,634. (No model.)

*To all whom it may concern:*

Be it known that I, PHILIP W. PRATT, of Boston, in the county of Suffolk and State of Massachusetts, have invented certain new and useful Improvements in Rubber Treads, of which the following is a specification.

This invention relates to rubber treads for application to the bottom surfaces of boots and shoes and other articles, but particularly to the soles of boots and shoes, the general object being to provide a yielding tread-surface; and while the principal object of my invention is to provide improved means for resisting wear of the yielding tread and decreasing the liability of slipping the invention consists in the improvements which I will now proceed to describe and claim.

Of the accompanying drawings, forming a part of this specification, Figure 1 represents a bottom plan view of a rubber tread embodying my invention. Fig. 2 represents a section on line 2 2 of Fig. 1. Fig. 3 represents a similar view to Fig. 1, showing a different arrangement. Fig. 4 represents a sectional view of the wear-resisting layer detached from the rubber layer. Fig. 5 represents a sectional view showing a tread having two layers of rubber.

The same letters of reference indicate the same parts in all the figures.

In the drawings, $a$ represents a body or layer of elastic vulcanized rubber, and $b$ represents a wear-resisting layer secured thereto by vulcanization. The layer $b$ is composed of canvas or other textile fabric frictioned—that is to say, coated on one or both sides with rubber prepared for vulcanization and secured to the layer $a$ by the vulcanizing operation—the layer $a$ being in an unvulcanized condition prior to the application of the layer $b$ to it, so that the vulcanizing operation renders permanent the material of the layer $a$ and the coating of the layer $b$.

In carrying out my invention I treat the layer $b$ while its rubber coating is unvulcanized and is therefore in a relatively soft and impressionable condition in such manner as to form indentations $b'$ in one side and corresponding projections $b^2$ on the opposite side, said indentations and projections being preferably conical and forming conical bosses. There are preferably two series of these bosses, one projecting outwardly from the outer surface of the layer $b$, while the other projects inwardly from the inner surface of said layer. When the parts are assembled and before the rubber is vulcanized, the plastic material of the layer $a$ enters and fills the recesses $b'$ on the inner side of the layer $b$, while the projections $b^2$ on the inner side of the layer $b$ extend into and are embedded in the layer $a$. This results in a much firmer adhesion of the layer $b$ to the layer $a$ than would be the case if both layers were flat at their contacting surfaces. The projections $b^2$ on the outer surface of the layer $b$ diversify or roughen the outer or wearing surface of the layer $b$, and thus decrease its liability of slipping. The treads forming the bosses are worn away at the apexes of the projections $b^2$ on the outer side of the layer $b$ and are thus exposed as parts of the wearing-surface, the said exposed treads having a tendency to cling to a smooth surface, and thus reduce the liability of slipping. The layer $b$ may cover the entire outer surface of the rubber layer $a$, or there may be several layers $b$ arranged in patches, as shown in Fig. 3, each patch being surrounded by an exposed portion of the layer $a$.

It will be seen that the portions of the elastic body which fill the indentations on the inner side of the layer $b$ support the projections on the outer side of said layer and prevent them from becoming permanently flattened.

In Fig. 5 I show a rubber layer $a'$, which covers the side of the layer $b$ opposite the body $a$ and is preferably thinner than the latter. The thickness of the layer $a'$ is such that the outer projections $b^2$ extend through it and form parts of the tread-surface. In this case the outer side of the layer $a'$ constitutes the main portion of the tread-surface, the outer projections $b^2$ furnishing wear-resisting parts of said surface.

I claim—

1. A rubber tread comprising an elastic body and a wear-resisting layer secured thereto and composed of a piece of textile fabric having indentations in its inner side and corresponding projections on its outer side, the material of the body filling said indentations.

2. A rubber tread comprising an elastic body and a wear-resisting layer secured thereto composed of a piece of textile fabric having indentations in its outer side and corresponding projections on its inner side, said projections being embedded in the body.

3. A rubber tread comprising an elastic body and a wear-resisting layer secured thereto composed of a piece of textile fabric having projections on each of its sides and corresponding indentations opposite the projections, the indentations and projections on the inner side engaging the elastic body, while the projections on the outer side diversify the wearing-surface.

4. A rubber tread comprising an elastic body, a wear-resisting layer secured thereto and composed of a piece of textile fabric having indentations in its inner side and corresponding projections on its outer side, and an elastic tread layer secured to the outer side of the wear-resisting layer, the said projections penetrating the tread layer and forming parts of the tread-surface.

In testimony whereof I have affixed my signature in presence of two witnesses.

PHILIP W. PRATT.

Witnesses:
  C. F. BROWN,
  E. BATCHELDER.